United States Patent
Smith, Jr. et al.

(10) Patent No.: US 10,308,162 B1
(45) Date of Patent: Jun. 4, 2019

(54) RELEASIBLE CARGO BED ENGAGING ANCHOR

(71) Applicant: Extreme Trailers, LLC, Dover, OH (US)

(72) Inventors: Leslie A Smith, Jr., Alliance, OH (US); Ryan L Rummell, Bowerston, OH (US)

(73) Assignee: EXTREME TRAILERS, LLC, Dover, OH (US)

(*) Notice: Subject to any disclaimer, the term of this patent is extended or adjusted under 35 U.S.C. 154(b) by 0 days.

(21) Appl. No.: 15/897,504

(22) Filed: Feb. 15, 2018

Related U.S. Application Data (60) Provisional application No. 62/461,276, filed on Feb. 21, 2017.

(51) Int. Cl.
*B60P 7/08* (2006.01)
*B62D 33/02* (2006.01)

(52) U.S. Cl.
CPC .............. *B60P 7/0807* (2013.01); *B60P 7/083* (2013.01); *B60P 7/0846* (2013.01); *B62D 33/02* (2013.01)

(58) Field of Classification Search
CPC ....... B60P 7/0807; B60P 7/083; B60P 7/0846; B62D 33/02

USPC .............. 410/102, 106, 110, 116; 24/115 K, 24/265 CD; 248/499

See application file for complete search history.

(56) References Cited

U.S. PATENT DOCUMENTS

| | | | |
|---|---|---|---|
| 7,090,449 B1 * | 8/2006 | Hugg .................... | B60P 7/0807 410/102 |
| 7,431,549 B1 * | 10/2008 | Prentice .................... | B60P 7/08 410/106 |
| 7,556,463 B1 * | 7/2009 | Hall ....................... | B60P 7/0815 410/104 |

* cited by examiner

*Primary Examiner* — Stephen T Gordon
(74) *Attorney, Agent, or Firm* — Ralph E. Jocke; Walker & Jocke (57) ABSTRACT

A cargo carrying vehicle (10, 130) includes a load supporting deck (24, 132). Cargo supported on the deck may be secured through releasible engaging anchors (32, 110). The anchor includes a base (34, 112) and a cap (36, 114). The base and cap are relatively rotatable about a pivot (64, 116). The base includes a claw end (40) configured for engaging a ledge projection (58) of a cargo bed (60). The cap includes a post (68, 122) and a cleat (70, 128) which bound a tie engaging recess (104). The cleat (70) also includes an aperture (90) suitable for accepting further ties therein.

22 Claims, 9 Drawing Sheets

RELEASIBLE CARGO BED ENGAGING ANCHOR

TECHNICAL FIELD

Exemplary embodiments described herein relate to cargo carrying vehicles. Exemplary embodiments further relate to releasible anchors to secure cargo on a supporting deck of a cargo carrying vehicle.

BACKGROUND

Cargo carrying vehicles often include a deck upon which cargo is supported. The cargo often must be securely held in place relative to the vehicle and deck by ties such as chains, ropes, bands or straps to keep the cargo from moving relative to the cargo deck during transport.

Structures and methods for securing cargo to a cargo supporting deck and/or other vehicle structures may benefit from improvements.

DETAILED DESCRIPTION

Figure 1:
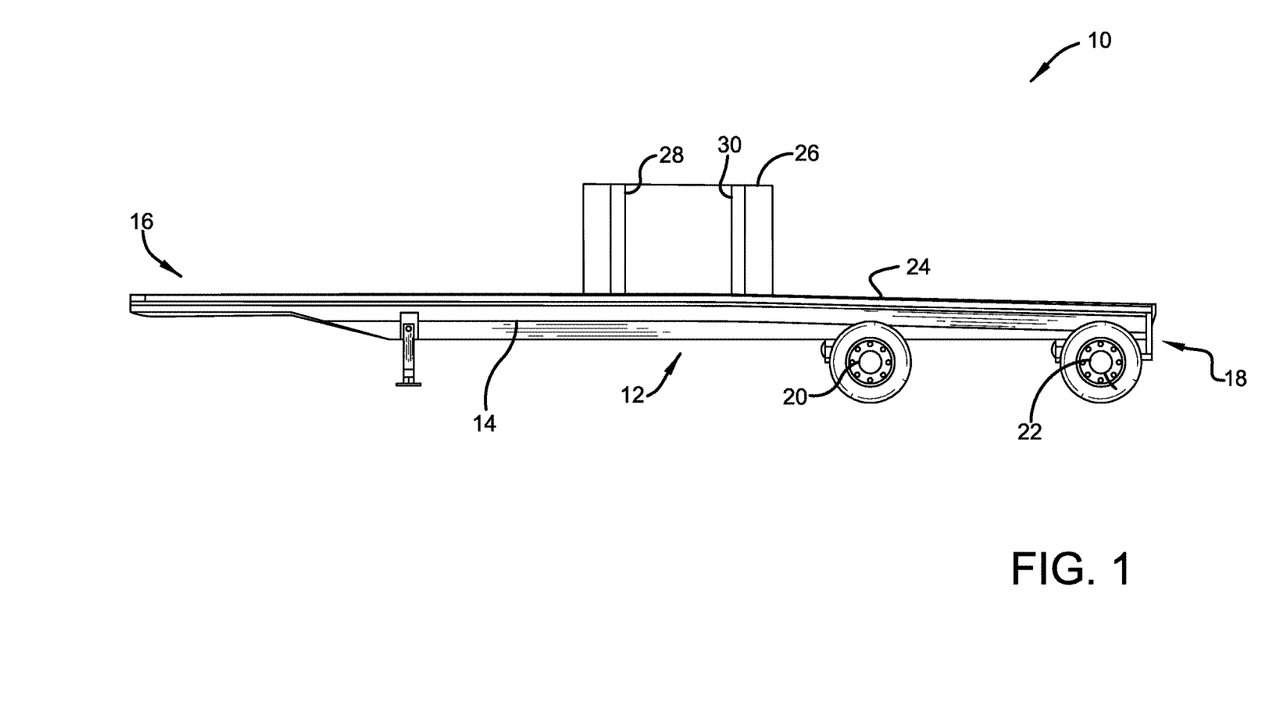
FIG. 1 is a side view of an exemplary cargo carrying vehicle in the form of a trailer.

Referring now to the drawings and particularly to FIG. 1 there is shown therein a cargo carrying vehicle. The exemplary cargo carrying vehicle comprises a trailer 10 such as a road going trailer that is configured to be towed behind another vehicle such as a semi tractor. However, it should be understood that this cargo carrying vehicle is exemplary and in other embodiments other types of cargo carrying vehicles may employ the principles and features described herein. Such vehicles may include, for example, truck beds, shipping containers, ships or other types of cargo carrying vehicles and structures that support cargo that needs to be held in a secure fixed manner with a supporting structure for transport, and released at a destination.

The exemplary trailer 10 includes a frame 12. The frame 12 includes a pair of longitudinally elongated frame rails 14 which extend substantially an entire longitudinal length of the exemplary trailer. The trailer includes a front portion 16 that is engageable with a tow vehicle. The trailer further includes a rear portion 18. The exemplary trailer further includes a pair of axles 20 and 22. The axles are in operative connection with the frame rails 14 through respective subframe components. In exemplary arrangements, the subframe components may include movable supports, air springs, shock absorbers and other suitable axle supporting components. Also in exemplary embodiments the axles may include tandem wheels and suitable braking components to enable over-the-road travel of the trailer.

The exemplary trailer further includes a cargo supporting deck 24. Deck 24 is supported by the frame rails and other support structures of the frame 12. The upper surface of the deck is configured for supporting cargo such as one or more crates 26. In some exemplary embodiments the deck 24 may be constructed in a manner like that described in U.S. Provisional Patent Application 62/378,523 filed Aug. 23, 2016, and/or U.S. patent application Ser. No. 15/680,890, filed Aug. 18, 2017, the disclosure of each of which is incorporated herein by reference in its entirety. However, in other embodiments, other deck structures and supporting arrangements may be used.

In exemplary arrangements, the one or more crates 26 are releasibly secured in engagement with the trailer and the load supporting deck 24. This is done using suitable ties such as ties 28 and 30. The ties may include, for example, suitable members to constrain movement of the cargo and maintain its position relative to the trailer. The ties commonly include chains, wire rope, fiber rope, straps, bands and other suitable materials that can be utilized for purposes of holding cargo in place. The nature of the ties utilized and the number and arrangement of ties commonly varies with the nature of the cargo that needs to be secured to the trailer.

The securing of cargo to the supporting deck and/or the vehicle structure for transport requires reliable and secure methods for engaging the ties, cargo and vehicle structure. Various methods for securing cargo may present risks of disengagement due to vibration and other conditions that occur during transit. In addition, some methods of securing ties and other structures to the cargo carrying vehicle may cause permanent deformation or damage to the vehicle structures which may pose issues when the vehicle is subsequently used for transporting other cargo.

FIGS. 2-7 show exemplary embodiments of releasible cargo bed engaging anchors. Such anchors are configured to provide improved securing capabilities for cargo by providing the ability to engage the anchor with multiple and different types of ties. The exemplary anchor embodiments further reduce the risk of damage to the vehicle structure as a result of the use thereof.

FIGS. 2-6 show an exemplary embodiment of a releasible cargo bed engaging anchor 32. The exemplary anchor 32 includes a base 34 and a cap 36. The base 34 and cap 36 are relatively rotatably movable via a pivot about an axis 38.

In the exemplary embodiment, the base 34 includes a claw end 40 and a hitch end 42. A shank 44 extends between the claw end and the hitch end.

The claw end 40 includes in cross section a turned hook portion 46. The turned hook portion 46 terminates at a hook end 48. The hook end 48 is disposed away from a first side surface of the shank 50. A gap 52 extends between the first side surface and the hook end.

In the exemplary arrangement, the hook end is elongated and extends between a first lateral side 54 and a second lateral side 56 of the claw end. In exemplary embodiments, the claw end is configured such that the hook end 48 and the gap 52 extend generally continuously in uniform cross section for about six inches between the first lateral side and the second lateral side of the claw portion.

Figure 3:
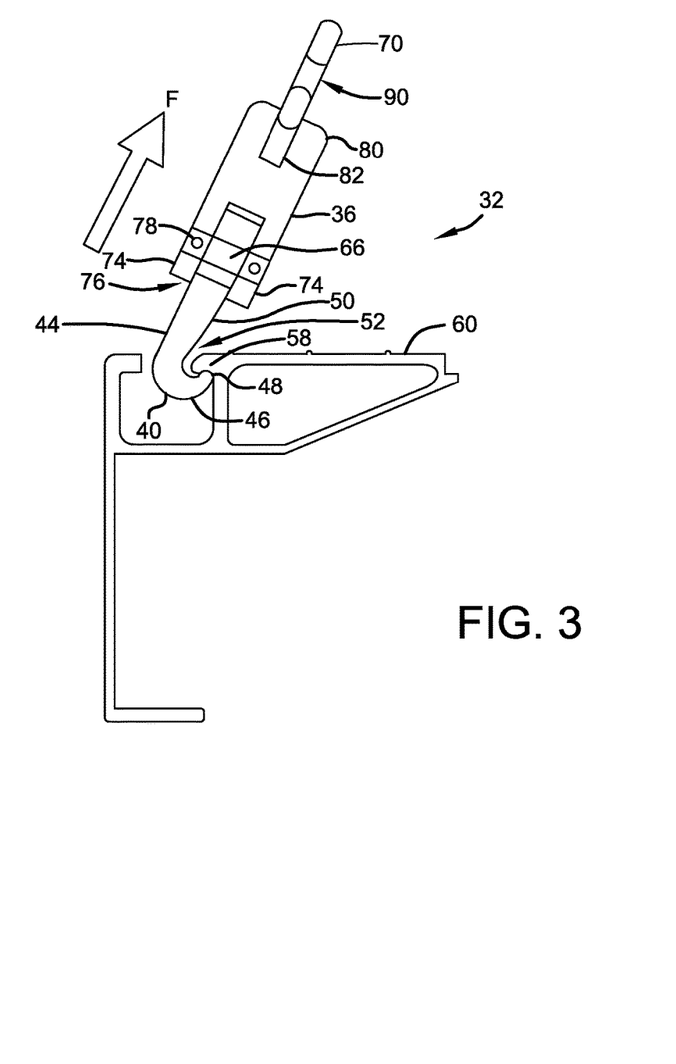
FIG. 3 is a side sectional view of the anchor in engagement with a ledge projection of a vehicle cargo bed.

As shown in FIG. 3, the configuration of the exemplary claw end 40 enables the hook end 48 to engage a ledge projection 58 of a cargo bed 60 which is shown in cross section. The cargo bed 60 may be part of the cargo supporting deck or another part of the support structure. The ledge projection 58 of exemplary embodiments extends a significant distance. One or more anchors may be engaged with the ledge projection at user selected positions along its length. Cargo beds of exemplary embodiments may include a plurality of ledge projections. The ledge projections may extend in different directions to facilitate the use of ties that extend in multiple directions.

As shown in FIG. 3 with the exemplary hook end 48 engaged with the ledge projection 58, the ledge projection extends in the gap 52. In this operative configuration, a ledge projection extends generally transversely to the shank 44 of the base. Further as represented by Arrow F in FIG. 3, the force of the straps, chains or other ties engaged with the anchor 32 acts generally transversely to the ledge projection 58, and the claw portion is engaged therewith in order to maintain secure engagement between the ledge portion and the anchor 32. Also in exemplary embodiments, the elongated surfaces of the hook end and claw portion operate to distribute the force applied by the ties to the anchor 32 over a wide area so as to reduce the risk of deformation of the ledge projection or other cargo bed structures in the area of engagement between the anchor and the cargo bed. The exemplary anchor can be readily disengaged from the bed when the force applied by the tie is removed.

The exemplary anchor base 34 further includes a tongue projection 62 on the hitch end 42. The exemplary tongue projection extends outward from the shank and in a direction away from the claw end.

The exemplary hitch end further includes a pivot 64. The pivot 64 enables the base 34 and the cap to rotate relative to one another about the axis 38. In exemplary embodiments, the pivot may include projections, a pin, or an opening which enables the base 34 and the cap 36 to be rotatable in moveable operative engagement. As represented in FIG. 3, in the exemplary arrangement the pivot includes a pin 66 that extends transversely through an opening in the tongue projection 62. In the exemplary arrangement, the opening in the tongue projection is generally centered between the lateral sides 64 and 66 of the claw end, which position facilitates the rotation thereof relative to the cap 36 as discussed herein in detail.

In the exemplary embodiment, the cap 36 includes a post 68 and a cleat 70. The exemplary post 68 includes a first end 72 that includes a clevis. The clevis includes a pair of arms 74. The arms 74 extend on each respective side of the tongue projection 62. The arms 74 also bound a clevis opening 76 in which the tongue projection of the hitch end 42 extends.

In the exemplary arrangement, the pivot extends in the clevis opening. In the exemplary arrangement as shown in FIG. 3, the pin 66 extends between the arms 74 of the clevis and through the opening in the tongue projection of the hitch end. The pin 66 is secured in place by set screws or other suitable fasteners 78. Of course it should be understood that this arrangement is exemplary and in other embodiments, other arrangements may be used.

The exemplary post 68 of the cap 36 includes a second end 80 opposed of the first end and clevis 72. The second end 80 includes a cutout 82. A central portion 84 of cleat 70 extends in the cutout 82. The central portion 84 of the cleat is secured to the post in the cutout by suitable fastening methods such as welding. Of course it should be understood that this approach is exemplary and in other embodiments, other approaches may be used.

Figure 2:
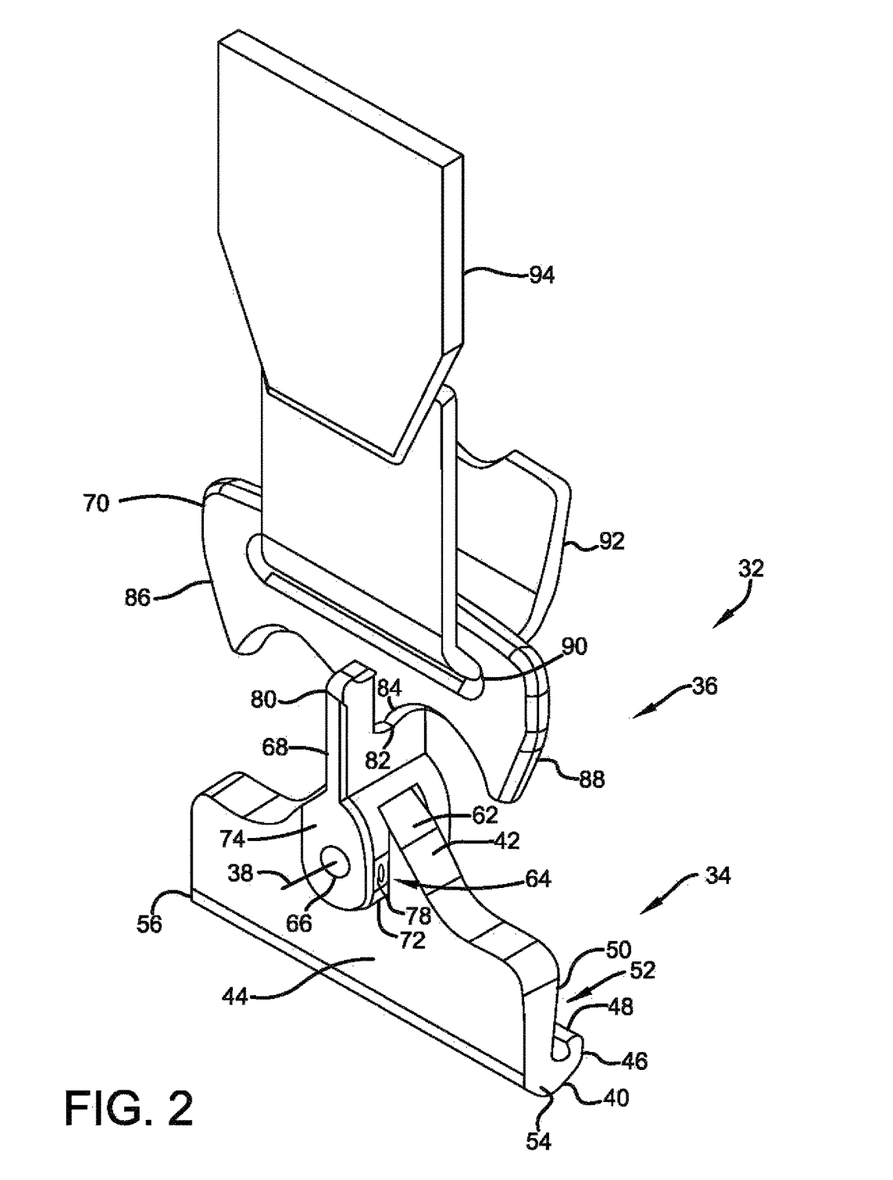
FIG. 2 is a top right respective view of a cargo bed engaging anchor engaged with a tie including a rigid hook.
Figure 4:
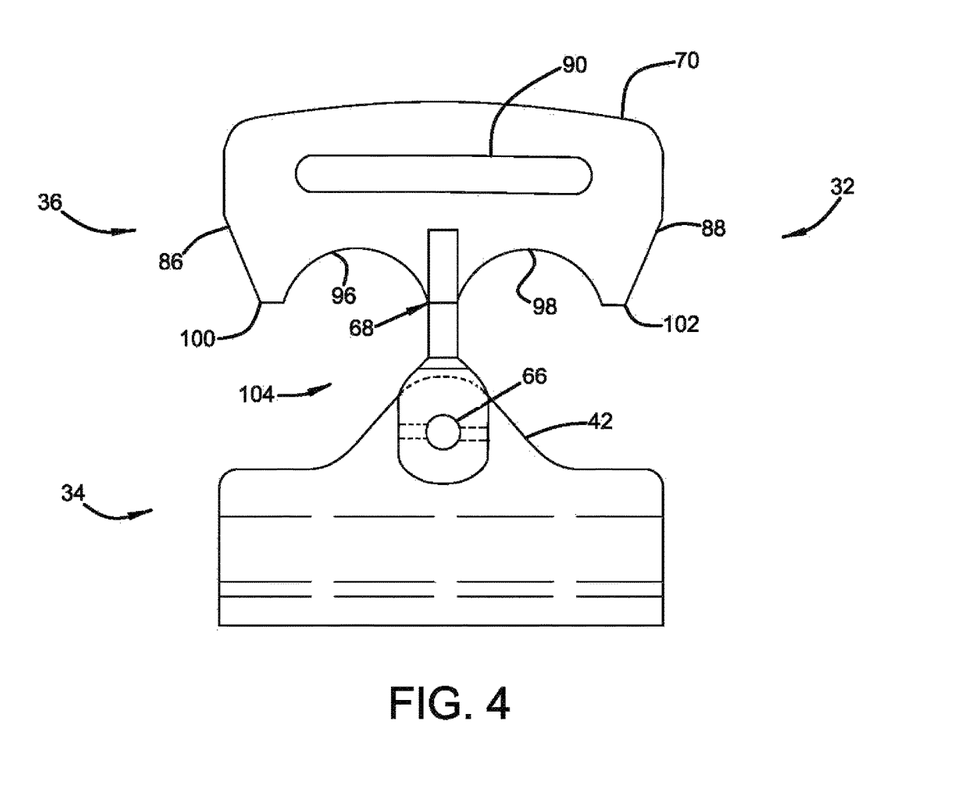
FIG. 4 is a front partially transparent view of the exemplary cargo bed engaging anchor.
Figure 5:
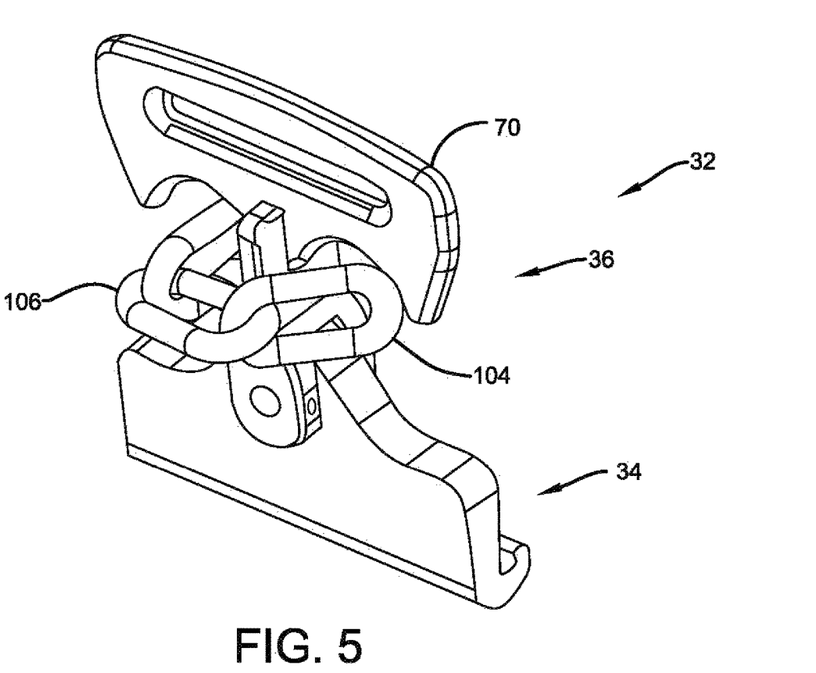
FIG. 5 is a top right perspective view of the anchor in engagement with a tie in the form of a chain.
Figure 6:
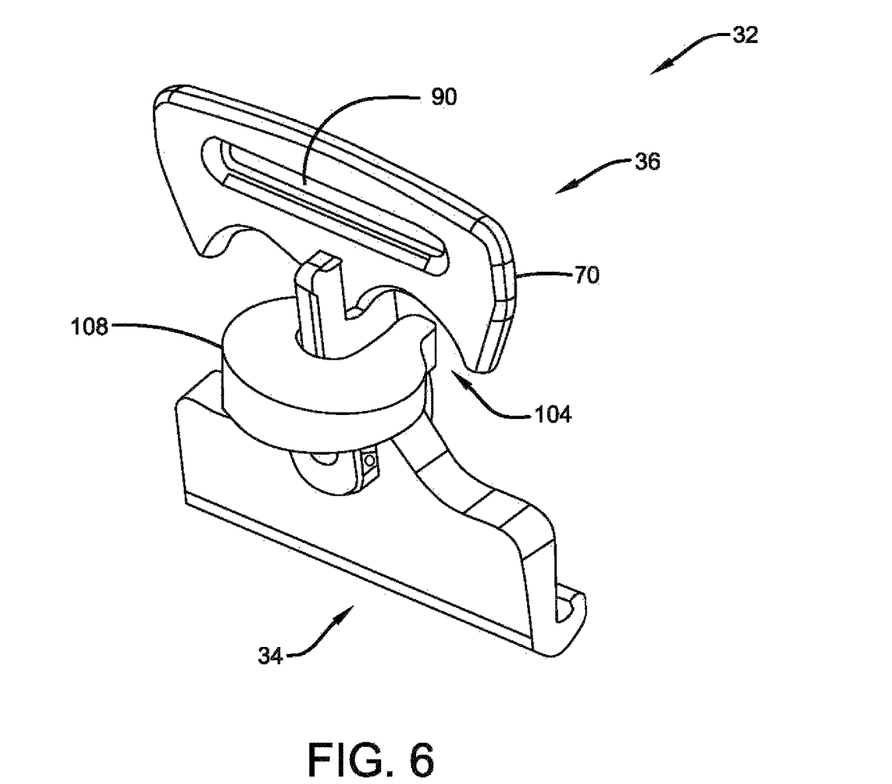
FIG. 6 is a view of the anchor similar to FIG. 5 but with the anchor in engagement with a tie in the form of a hook.

In the exemplary embodiment the cleat 70 is laterally elongated and extends between cleat lateral sides 86 and 88. In the exemplary arrangement, the cleat generally has a lateral width that corresponds to the lateral width of the claw portion. Of course this arrangement is exemplary and in other embodiments, other configurations and proportions may be utilized. The exemplary anchor 32 further is configured such that the cap has a generally T-shaped configuration. This configuration has certain advantages as later explained. However, in other arrangements, other configurations may also be utilized.

In the exemplary arrangement, the cleat 70 includes a aperture 90 therethrough. In the exemplary arrangement, the aperture 90 comprises an elongated slot. The elongated slot of the exemplary anchor 32 is configured for accepting a suitable tie therein. In the arrangement shown in FIG. 2, the tie comprises a rigid hook 92 that is attached to a flexible strap 94. The aperture 90 is configured to enable the hook 92 to be extended therethrough. Of course it should be understood that the elongated slot configuration of the aperture is exemplary and in other embodiments, one or more apertures having different shapes may be utilized for purposes of engaging suitable ties.

As can be appreciated from FIG. 2, the exemplary anchor 32 provides the capability for the cap 36 to be suitably rotatably positioned relative to the base 34 to accommodate different angular orientations of the ties that may be attached to the cleat portion 70. As can be appreciated with different types of cargo in different types of orientations, the cleat 70 may be desirably positioned at different angles relative to the base 34 through the pivot. However, in the exemplary arrangement, the possible range of angular orientation of the cap 36 relative to the base enables the claw end to maintain secure engaged relation with the ledge projection to which the claw portion is engaged.

As further represented in FIG. 4, the exemplary cleat 70 of the cap 36 includes a pair of face surfaces 96 and 98. The exemplary face surfaces are configured to be in generally facing relation of the base 34. Each face surface extends on a respective lateral side of the post 68.

The exemplary face portions are curved such that with increasing proximity to the adjacent cleat lateral edge 86, 88 the face portion is closer to the base. Thus in the exemplary arrangement the face surfaces 98 and 96 are closer to the base 34 as the respective face surface moves closer to respective inner tips 100, 102 at the respective cleat lateral side 86, 88.

Further in the exemplary embodiment, the face surfaces 96 and 98 are curved such that the face surfaces extend closer to the base 34 with increasing proximity to the post 68 of the cap 36. Thus as shown in FIG. 34, the pair of face surfaces have a generally scalloped configuration on each side of the post 68.

In the exemplary embodiment, the face surfaces 96 and 98 and the hitch end 42 of the base 34 bound a recess 104. Recess 104 extends generally around the post 68. The recess 104 of the exemplary anchor 32 is configured to engage a tie that is extended in the recess 104. In exemplary arrangements, the tie may include a generally U-shaped portion that extends in the recess 104 such as a chain 106 is shown extending in the recess in FIG. 5. Similarly a tie in the form of a hook 108 is shown in engagement with the anchor 32 by extending in the recess 104 in FIG. 6. Of course it should be understood that numerous different types of ties may be engaged with the anchor by having a generally U-shaped portion thereof extending around the post in the recess 104. Such ties may commonly include hooks, fiber ropes, wire ropes, chains, straps, banding, or other suitable ties which can be used to engage the anchor by extending in the recess.

Further in exemplary arrangements, the anchor 32 can be utilized to engage multiple types of ties simultaneously. This may be accomplished by engaging a tie in the recess 104 while a further tie is engaged in the aperture 90. This enables multiple different types of ties to be engaged with the anchor so as to provide additional options for securing the cargo in engagement with the trailer deck or other cargo supporting structure.

Figure 7:
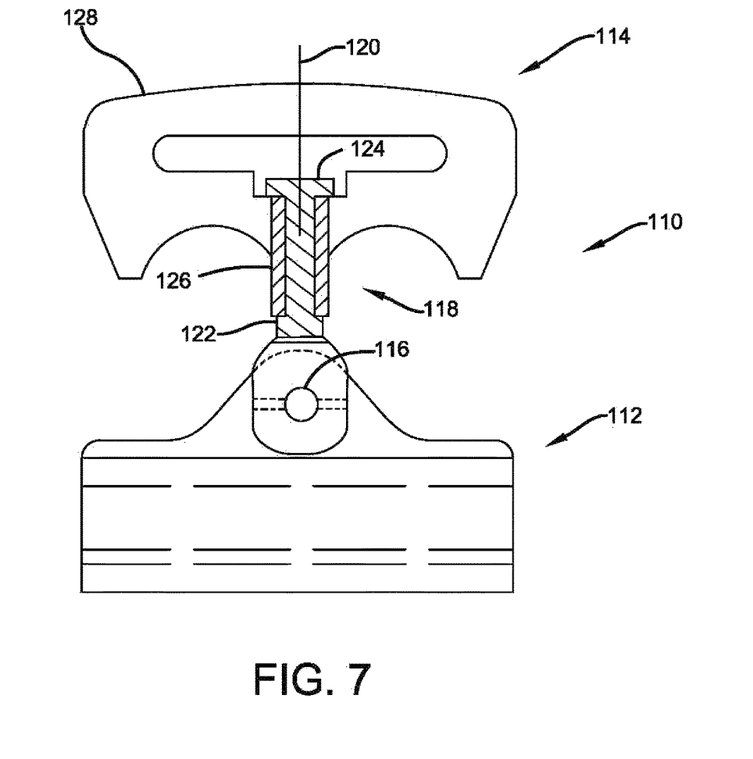
FIG. 7 is a front partially sectioned view of an alternative releasible cargo bed engaging anchor including a swivel joint.

FIG. 7 shows an alternative exemplary embodiment of an anchor 110 which is shown in partial cross section. Anchor 110 is similar to anchor 32 except as otherwise expressly indicated.

Anchor 110 includes a base 112 and a cap 114. The base and cap are connected through a pivot 116 which may operate in a manner similar to pivot 64.

Unlike anchor 32, the cap portion 114 includes a swivel joint 118. Swivel joint 118 enables the cap portion to rotate relative to the base 112 about an axis 120. In the exemplary embodiment, the axis 120 extends generally perpendicular to the axis of rotation of the pivot 116.

In the exemplary arrangement the cap 114 includes a post 122 that extends from a first end including a clevis which includes the pivot 116, to a head 124 at an opposed end of the post. A bushing 126 is rotatable relative to the post 122. The exterior of the bushing is in operatively fixed engagement with the cleat 128. The head 124 holds the bushing in engagement with the post 122.

This structure enables the cleat to rotate relative to the post 122 and the post to rotate relative the axis of the pivot 116. This exemplary structure enables a tie which extends through the aperture of the cleat to be positioned in numerous different angular orientations based on movement of the cleat relative to the two axes of rotation. This further facilitates the capabilities for engaging different ties to the anchor 110 so as to enable the securing of many different types of cargo. Of course it should be understood that the structures shown are exemplary and in other embodiments, other approaches may be used.

Figure 8:
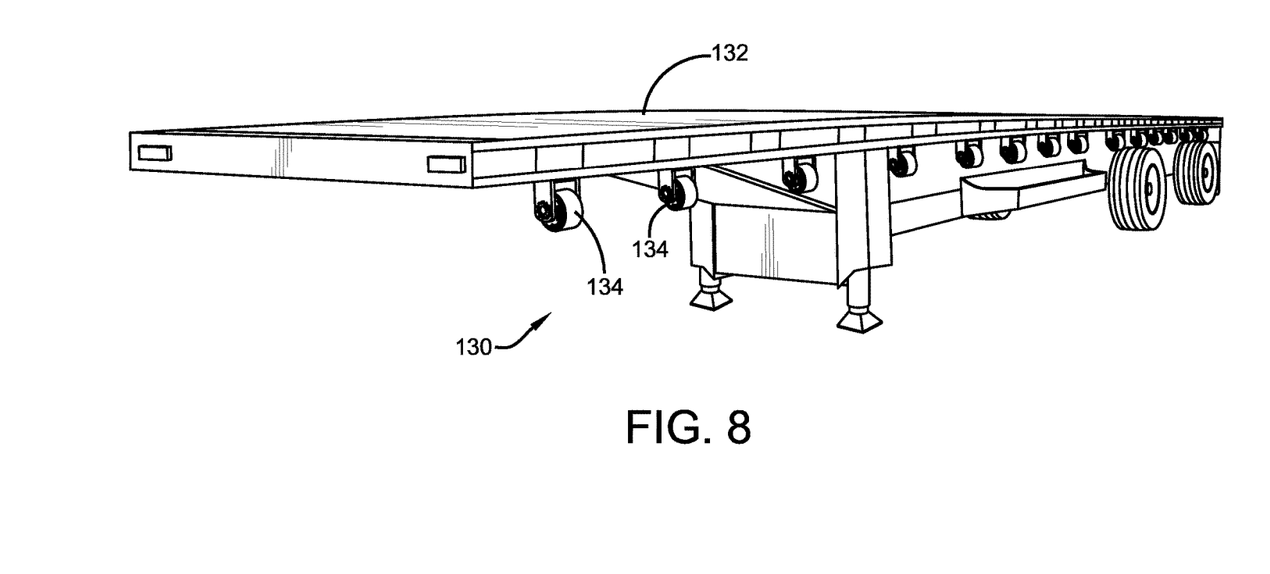
FIG. 8 is a front right perspective view of an alternative trailer including a plurality of flexible ties engaged with ratchet reels.
Figure 9:
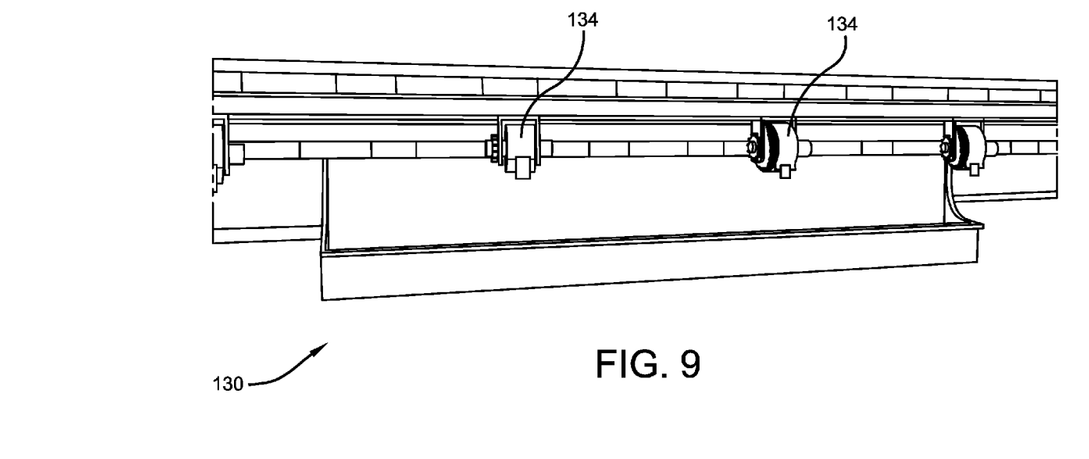
FIG. 9 is a side view of the trailer shown in FIG. 8 including a plurality of ratchet reels and flexible ties.

FIGS. 8 and 9 show an alternative embodiment of a trailer 130. Trailer 130 may be generally similar to trailer 10 previously described and includes a cargo supporting deck 132.

The trailer 130 includes a plurality of longitudinally spaced tie holding ratchet reels 134. In the exemplary arrangement, the ratchet reels 134 are configured for holding flexible ties such as straps in engagement therewith. The straps may include in some arrangements, rigid hook ends similar to the strap arrangement described in connection with FIG. 2.

The ratchet reels are selectively movable to enable the respective flexible tie in the form of a strap to be wound onto and wound off of the respective ratchet reel. Each ratchet reel further includes a selectively engageable ratchet mechanism. The ratchet mechanisms when engaged enable the reel to pull on and tighten the strap and hold it in the current angular position so that it cannot be unwound from the reel.

Thus as can be appreciated, in exemplary arrangements flexible straps from a plurality of the ratchet reels that are mounted on the frame of the trailer may be utilized to engage cargo supported on the deck 132. Further the straps may be extended so as to engage the exemplary anchors which may be positioned at suitable engaging locations of the deck or other cargo bed structure. Of course additional ties of various types may be utilized and engaged with the exemplary anchors and other structures of the deck to hold the cargo in a secure and immovable manner during transport.

Further, when one or more of the respective straps are not in use, the straps may be stored by being wound on the ratchet reel so as to not interfere with the operation of the trailer or other securing mechanisms that may be utilized.

Further it should be understood that while in the exemplary arrangement, the ratchet reels are described as supporting ties in the form of flexible straps thereon, in other arrangements ratchet reels may be utilized in connection with other types of ties such as chains, bands, ropes and other suitable ties for the type of cargo to be handled by the trailer.

Thus the exemplary embodiments described herein achieve improved operation, eliminate difficulties encountered in the use of prior devices and systems, and attain the useful results that are referred to herein.

In the foregoing description, certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the new and useful concepts and structures are not limited to the features shown and described.

It should be understood that features and/or relationships associated with one embodiment may be combined with features and/or relationships of another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained; the new and useful features, devices, elements, arrangements, parts, combinations, systems, equipment, operations, methods, processes and relationships are set forth in the appended claims.

We claim:

1. Apparatus comprising:
   a releasible cargo bed engaging anchor, including:
   a base, wherein the base includes
     a claw end,
     a hitch end opposed of the claw end,
     a shank, wherein the shank extends between the hitch end and the claw end,
     wherein in transverse cross section, the claw end includes
       a turned hook portion, wherein the hook portion terminates in a hook end,
       wherein the hook end is disposed away and separated from a first side surface of the shank,
       wherein a gap extends intermediate of the hook end and the first side surface,
     wherein the hook end and the gap are laterally elongated and of generally uniform cross section between a first lateral side and a second lateral side of the claw end,
     wherein the hook end is configured to engage a ledge projection of a cargo bed, wherein the ledge projection extends in the gap and generally transversely of the shank,
     wherein the hitch end includes a pivot, wherein the pivot
       is generally centered relative to the first and second sides of the claw end, includes one of a projection, a pin or an opening in the hitch end of the base,
a cap, wherein the cap includes
a post, and
a cleat,
wherein the post includes a first post end and an opposed second post end,
wherein the first post end is movably rotatably operatively engaged with the base through the pivot,
wherein the cleat is operatively engaged with the post at the second post end,
wherein the cleat is laterally elongated relative to the post and includes a pair of face surfaces that extend in generally facing relation toward the base,
wherein one face surface of the pair extends on each respective lateral side of the post,
wherein the pair of face surfaces and the hitch end of the base bound a recess, wherein the recess extends generally around the post,
wherein the recess is configured to enable a tie having a generally U shape to engage the anchor by extending around the post in the recess.

2. The apparatus according to claim 1
wherein the cleat includes an aperture therethrough,
wherein the aperture is configured to engagingly receive a further tie therein.

3. The apparatus according to claim 2
wherein the aperture comprises an elongated slot.

4. The apparatus according to claim 2
wherein the first post end includes a clevis,
wherein the clevis includes a clevis opening,
wherein the hitch end extends in the clevis opening.

5. The apparatus according to claim 4
wherein the pivot is positioned within the clevis opening.

6. The apparatus according to claim 5
wherein the hitch end includes a tongue projection
wherein the tongue projection extends outwardly relative to the shank and away from the claw end,
wherein the tongue projection extends in the clevis opening and includes the pivot.

7. The apparatus according to claim 6
wherein the cleat is bounded by opposed cleat lateral sides,
wherein the face surfaces are each configured such that each face surface extends closer to the base with increasing proximity to a corresponding respective one of the cleat lateral sides.

8. The apparatus according to claim 7
wherein each face surface includes a curved portion,
wherein each curved portion extends closer to the base with increasing proximity to a respective one of the cleat lateral sides.

9. The apparatus according to claim 8
wherein each curved portion extends closer to the base with increasing proximity to each of the post and a respective one of the cleat lateral sides.

10. The apparatus according to claim 9
wherein the second post end includes a cutout, and wherein the cleat extends in the cutout.

11. The apparatus according to claim 7
wherein the hook end extends laterally about six inches between the first and second sides of the claw end.

12. The apparatus according to claim 7
wherein the pivot enables the cap to rotate relative to the base about a first axis,
wherein the cap includes a swivel joint,
wherein the swivel joint enables the cleat to rotate relative to the base about a second axis that is perpendicular to the first axis.

13. The apparatus according to claim 7
wherein the tie includes at least one of
a hook,
a rope,
a chain,
a band,
a flexible strap,
and the further tie includes at least one of
a further hook,
a further band,
a further rope,
a further flexible strap.

14. The apparatus according to claim 7 and further comprising
a trailer including the cargo bed
wherein the trailer includes a plurality of ratchet reels, each ratchet reel including a flexible tie operatively attached thereto,
wherein each flexible tie is configured to operatively engage the anchor.

15. The apparatus according to claim 14
wherein each flexible tie includes a respective rigid hook, wherein the rigid hook is configured to engage the aperture of the anchor.

16. The apparatus according to claim 1
wherein the first post end includes a clevis,
wherein the clevis includes a clevis opening,
wherein the hitch end extends in the clevis opening.

17. The apparatus according to claim 1
wherein the hitch end includes a tongue projection,
wherein the tongue projection extends outwardly relative to the shank and away from the claw end,
wherein the tongue projection includes the pivot.

18. The apparatus according to claim 1
wherein the cleat is bounded by opposed cleat lateral sides,
wherein the face surfaces are each configured such that each face surface extends closer to the base with increasing proximity to a corresponding respective one of the cleat lateral sides.

19. The apparatus according to claim 18
wherein each face surface includes a curved portion,
wherein each curved portion extends closer to the base with increasing proximity to each of the post and a respective one of the cleat lateral sides.

20. The apparatus according to claim 1
wherein the second post end includes a cutout, and wherein the cleat extends in the cutout.

21. The apparatus according to claim 1
wherein the pivot enables the cap to rotate relative to the base about a first axis,
wherein the cap includes a swivel joint,
wherein the swivel joint enables the cleat to rotate relative to the base about a second axis that is perpendicular to the first axis.

22. The apparatus according to claim 1 and further comprising
a trailer including the cargo bed
wherein the trailer includes a plurality of ratchet reels, each ratchet reel including a flexible tie operatively attached thereto, wherein each flexible tie is configured to operatively engage the anchor.

* * * * *